(12) United States Patent
Sasaki et al.

(10) Patent No.: US 9,378,762 B1
(45) Date of Patent: Jun. 28, 2016

(54) THERMALLY-ASSISTED MAGNETIC RECORDING HEAD INCLUDING A WAVEGUIDE AND TWO PLASMON GENERATORS

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Kazuki Sato, Milpitas, CA (US); Seiichiro Tomita, Milpitas, CA (US)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Kazuki Sato, Milpitas, CA (US); Seiichiro Tomita, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/750,589

(22) Filed: Jun. 25, 2015

(51) Int. Cl.
*G11B 5/02* (2006.01)
*G11B 11/00* (2006.01)
*G11B 5/48* (2006.01)
*G11B 5/00* (2006.01)

(52) U.S. Cl.
CPC ...... *G11B 5/4866* (2013.01); *G11B 2005/0021* (2013.01)

(58) Field of Classification Search
CPC ........ G11B 9/12; G11B 6/1226; G11B 5/314; G11B 5/3133; G11B 7/24059; G11B 13/08; G11B 2005/0021; G11B 5/6088; G02B 6/124; G02B 6/02085; G02B 6/12007
USPC ................. 369/112.27, 112.23, 13.33, 13.13, 369/13.24, 13.17, 112.24; 360/59, 123.02, 360/123.24; 385/37
See application file for complete search history.

(56) References Cited

U.S. PATENT DOCUMENTS

| 8,116,175 B2 * | 2/2012 | Chou ...................... G11B 11/00 369/112.27 |
| 8,619,517 B1 | 12/2013 | Sasaki et al. |
| 2007/0139818 A1 | 6/2007 | Shimazawa et al. |

* cited by examiner

*Primary Examiner* — Nabil Hindi
(74) *Attorney, Agent, or Firm* — Oliff PLC

(57) ABSTRACT

A thermally-assisted magnetic recording head includes a waveguide, a first plasmon generator, and a second plasmon generator. The waveguide includes a core and a cladding. The first plasmon generator is located on the leading side of the core. The second plasmon generator is located on the trailing side of the core. The cladding includes a first interposition section and a second interposition section, the first interposition section being interposed between the core and the first plasmon generator, the second interposition section being interposed between the core and the second plasmon generator.

5 Claims, 17 Drawing Sheets

THERMALLY-ASSISTED MAGNETIC RECORDING HEAD INCLUDING A WAVEGUIDE AND TWO PLASMON GENERATORS

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To eliminate this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2007/0139818 A1 discloses a thermally-assisted magnetic recording head configured to excite plasmons on a plasmon generator (a near-field-light generating layer) by directly irradiating the plasmon generator with laser light.

U.S. Pat. No. 8,619,517 B1 discloses a technology in which the surface of the core of the waveguide and the surface of the plasmon generator are arranged to face each other with a gap therebetween, so that evanescent light that occurs from the surface of the core based on the laser light propagating through the core is used to excite surface plasmons on the plasmon generator to generate near-field light based on the excited surface plasmons.

The configuration in which a plasmon generator is directly irradiated with laser light to excite plasmons on the plasmon generator, such as one disclosed in U.S. Patent Application Publication No. 2007/0139818 A1, has a number of problems as follows. First, such a configuration has the problem of low efficiency of transformation of laser light into near-field light because most part of the laser light is reflected at the surface of the plasmon generator or transformed into thermal energy and absorbed by the plasmon generator. Further, the aforementioned configuration has the problem that the plasmon generator greatly increases in temperature when it absorbs thermal energy, and this may result in deformation of or damage to the plasmon generator.

The configuration in which evanescent light is used to excite surface plasmons on a plasmon generator, such as one disclosed in U.S. Pat. No. 8,619,517 B1, provides higher efficiency of transformation of laser light into near-field light when compared with the case of directly irradiating the plasmon generator with laser light.

However, even the configuration in which evanescent light is used to excite surface plasmons on a plasmon generator causes an increase in temperature of the plasmon generator although the increase is smaller than that caused by the configuration in which the plasmon generator is directly irradiated with laser light to excite plasmons on the plasmon generator.

To avoid the problem associated with a temperature increase of the plasmon generator, the power of the laser light can be reduced to allow the plasmon generator to generate a smaller amount of heat. In such a case, however, it is not possible to apply a sufficient amount of heat to the recording medium.

OBJECT AND SUMMARY OF THE INVENTION

It is an object of the present invention to provide a thermally-assisted magnetic recording head configured to excite surface plasmons on a plasmon generator by using evanescent light, the thermally-assisted magnetic recording head being capable of applying a sufficient amount of heat to a recording medium and suppressing a temperature rise of the plasmon generator.

A thermally-assisted magnetic recording head of the present invention includes: a medium facing surface configured to face a recording medium; a main pole; a waveguide; a first plasmon generator; and a second plasmon generator. The main pole has an end face located in the medium facing surface, and produces a write magnetic field for use to write data on the recording medium. The waveguide includes a core and a cladding, the core allowing light to propagate therethrough, the cladding being provided around the core. The first plasmon generator has a first plasmon exciting section and a first near-field light generating section. The second plasmon generator has a second plasmon exciting section and a second near-field light generating section.

The first plasmon generator, the core and the second plasmon generator are arranged in this order along the direction of travel of the recording medium. The first near-field light generating section and the second near-field light generating section are located in the medium facing surface. The second near-field light generating section is located on the front side in the direction of travel of the recording medium relative to the first near-field light generating section.

The core has a first evanescent light generating surface facing toward the first plasmon generator, and a second evanescent light generating surface facing toward the second plasmon generator. The first plasmon exciting section is located at a predetermined distance from the first evanescent light generating surface and faces the first evanescent light generating surface. The second plasmon exciting section is located at a predetermined distance from the second evanescent light generating surface and faces the second evanescent light generating surface. The cladding includes a first interposition section and a second interposition section, the first interposition section being interposed between the first evanescent light generating surface and the first plasmon exciting section, the second interposition section being interposed between the second evanescent light generating surface and the second plasmon exciting section.

The first evanescent light generating surface is configured to generate first evanescent light based on the light propagating through the core. The second evanescent light generating surface is configured to generate second evanescent light based on the light propagating through the core.

The first plasmon generator is configured so that a first surface plasmon is excited on the first plasmon exciting section through coupling with the first evanescent light generated by the first evanescent light generating surface, the first surface plasmon propagates to the first near-field light generating section, and the first near-field light generating section generates first near-field light based on the first surface plasmon. The second plasmon generator is configured so that a second surface plasmon is excited on the second plasmon exciting section through coupling with the second evanescent light generated by the second evanescent light generating surface, the second surface plasmon propagates to the second near-field light generating section, and the second near-field light generating section generates second near-field light based on the second surface plasmon.

In the thermally-assisted magnetic recording head of the present invention, the first near-field light generating section may have a greater width in the track width direction than does the second near-field light generating section.

In the thermally-assisted magnetic recording head of the present invention, the first near-field light generating section may have a zigzag shape.

In the thermally-assisted magnetic recording head of the present invention, at least part of the first evanescent light generating surface and at least part of the first plasmon exciting section may both be inclined with respect to an imaginary straight line such that the distance from the imaginary straight line decreases with increasing proximity to the medium facing surface, the imaginary straight line passing internally through the core and being parallel to the direction of travel of the light propagating through the core.

In the thermally-assisted magnetic recording head of the present invention, at least part of the second evanescent light generating surface and at least part of the second plasmon exciting section may both be inclined with respect to an imaginary straight line such that the distance from the imaginary straight line decreases with increasing proximity to the medium facing surface, the imaginary straight line passing internally through the core and being parallel to the direction of travel of the light propagating through the core.

According to the thermally-assisted magnetic recording head of the present invention, the first plasmon generator preheats the recording medium, and the second plasmon generator further heats the preheated recording medium to a required temperature. The present invention thus makes it possible to apply a sufficient amount of heat to the recording medium and to suppress temperature increases of the first and second plasmon generators.

Other and further objects, features and advantages of the present invention will appear more fully from the following description.

DETAILED DESCRIPTION OF THE PREFERRED EMBODIMENTS

First Embodiment

Figure 1:
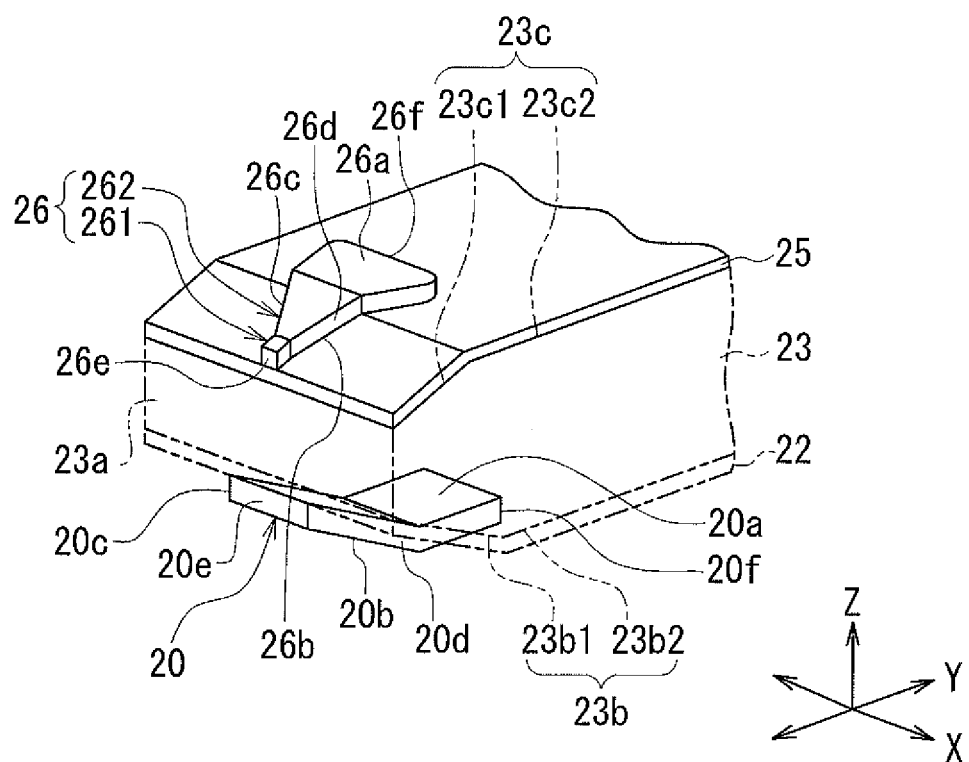
FIG. 1 is a perspective view showing the main part of a thermally-assisted magnetic recording head according to a first embodiment of the invention.
Figure 2:
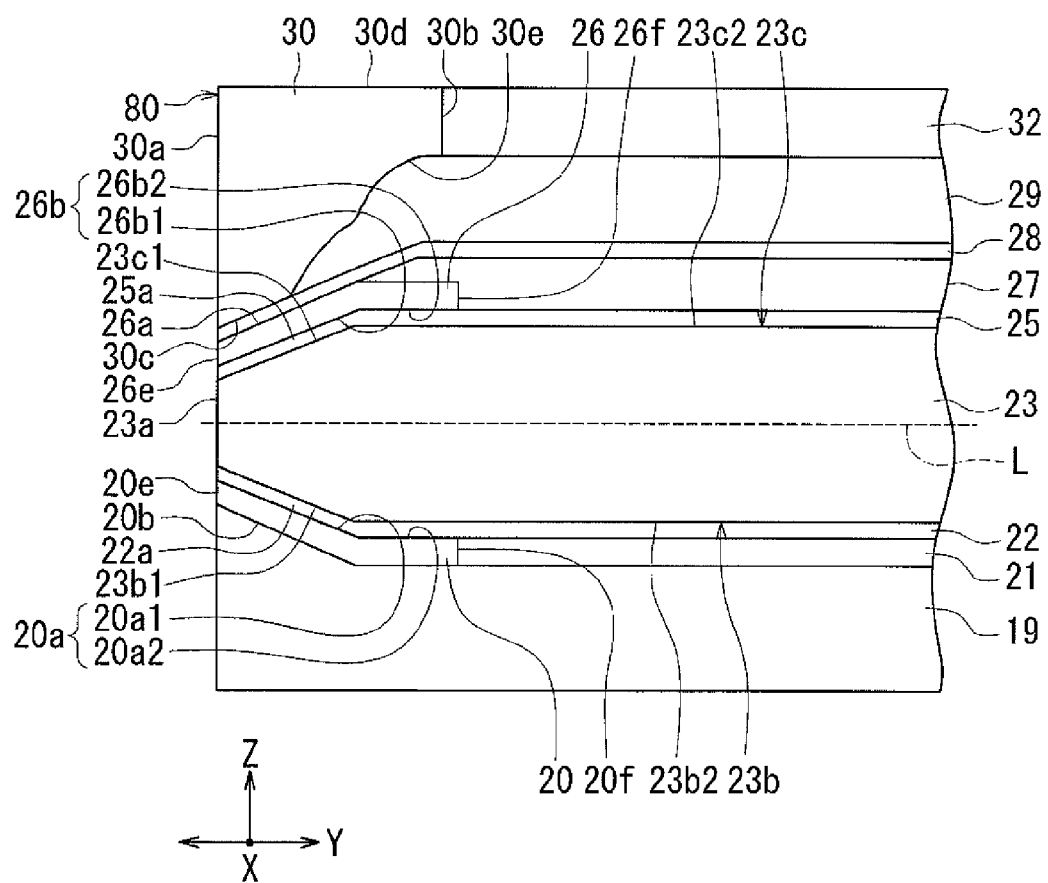
FIG. 2 is a cross-sectional view showing the main part of the thermally-assisted magnetic recording head according to the first embodiment of the invention.
Figure 3:
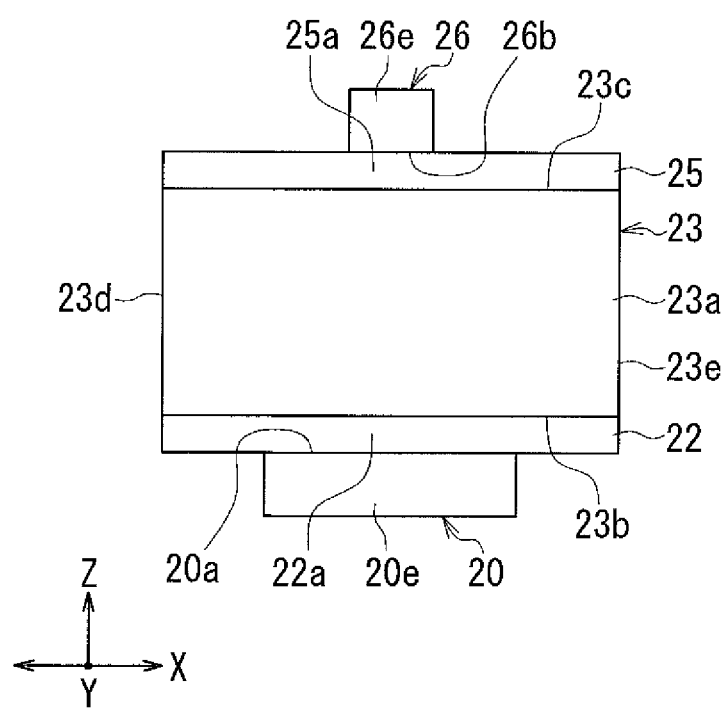
FIG. 3 is a front view showing a core, a first plasmon generator, and a second plasmon generator of the first embodiment of the invention.
Figure 4:
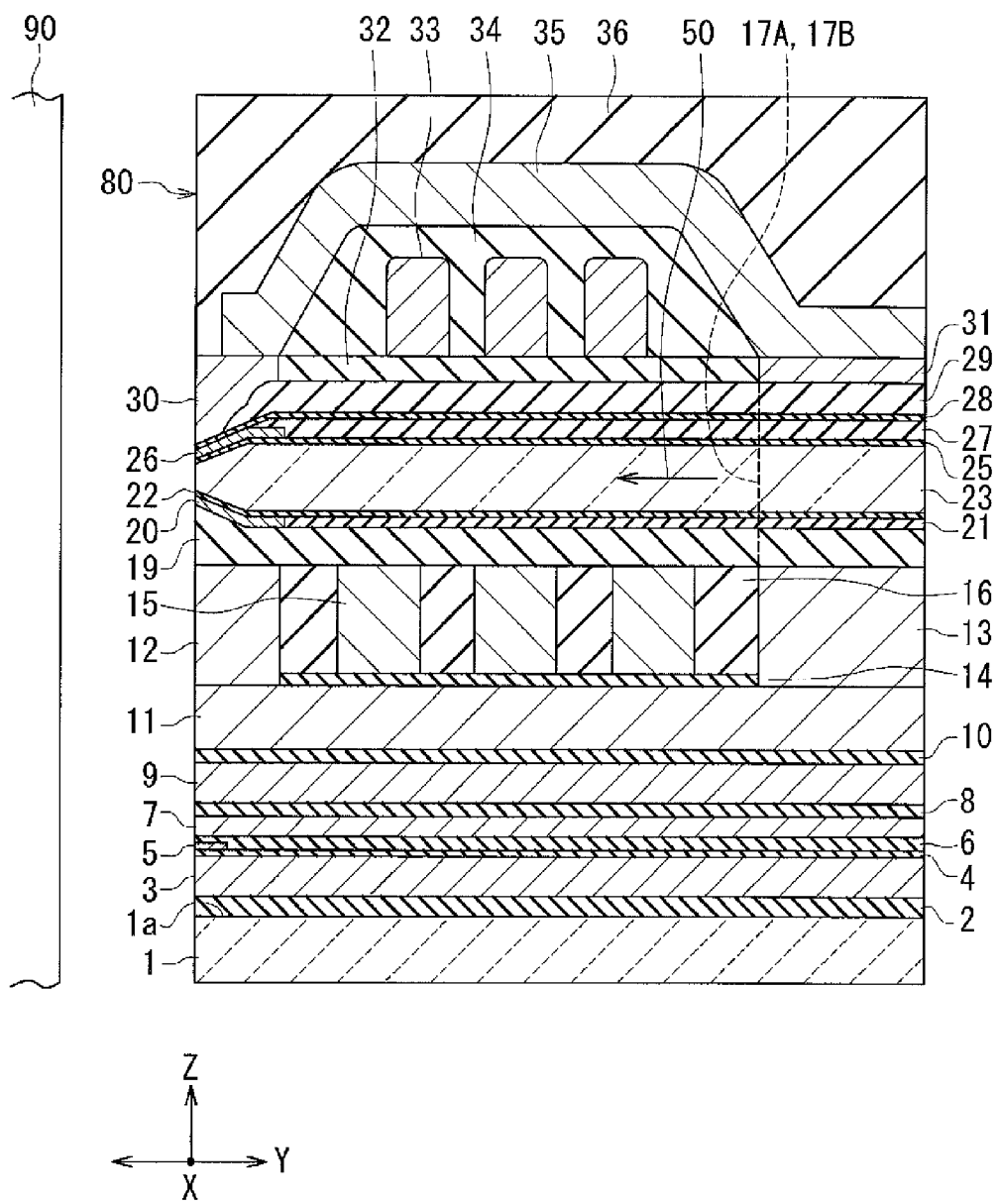
FIG. 4 is a cross-sectional view showing the configuration of the thermally-assisted magnetic recording head according to the first embodiment of the invention.
Figure 5:
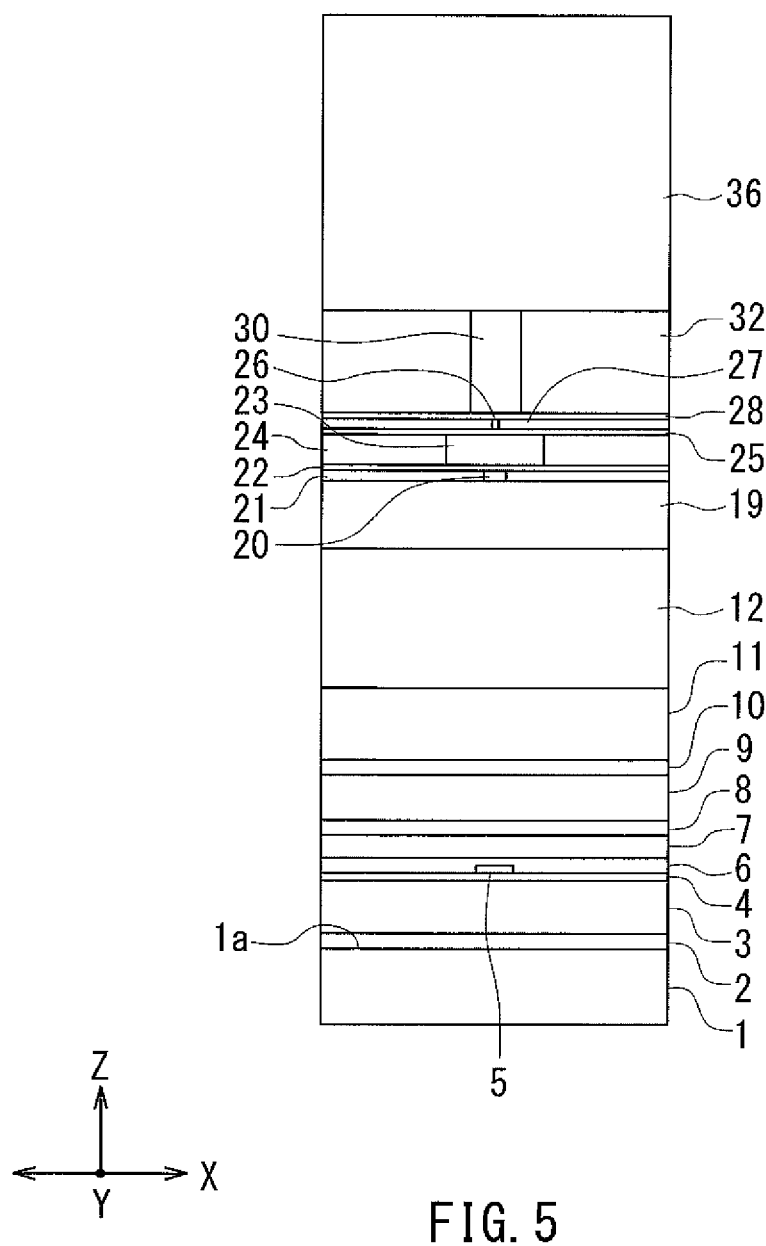
FIG. 5 is a front view showing the medium facing surface of the thermally-assisted magnetic recording head according to the first embodiment of the invention.

Preferred embodiments of the present invention will now be described in detail with reference to the drawings. First, reference is made to FIG. 1 to FIG. 5 to describe the configuration of a thermally-assisted magnetic recording head according to a first embodiment of the invention. FIG. 1 is a perspective view showing the main part of the thermally-assisted magnetic recording head. FIG. 2 is a cross-sectional view showing the main part of the thermally-assisted magnetic recording head. FIG. 3 is a front view showing a core, a first plasmon generator, and a second plasmon generator. FIG. 4 is a cross-sectional view showing the configuration of the thermally-assisted magnetic recording head. FIG. 5 is a front view showing the medium facing surface of the thermally-assisted magnetic recording head.

The thermally-assisted magnetic recording head according to the present embodiment is intended for use in perpendicular magnetic recording, and is incorporated in a slider configured to fly over the surface of a rotating recording medium 90. The slider has a medium facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 4, the thermally-assisted magnetic recording head has the medium facing surface 80. Here, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 4 and FIG. 5, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 lying on the top shield layer 7, a middle shield layer 9 formed of a magnetic material and lying on the insulating layer 8, a nonmagnetic layer 10 formed of a nonmagnetic material and lying on the middle shield layer 9, and a write head unit lying on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit further includes a return pole layer 11 formed of a magnetic material and lying on the nonmagnetic layer 10, and an insulating layer (not illustrated) lying on the nonmagnetic layer 10 and surrounding the return pole layer 11. The return pole layer 11 has an end face located in the medium facing surface 80. The non-illustrated insulating layer is formed of alumina, for example.

The write head unit further includes: a shield layer 12 lying on a first portion of the top surface of the return pole layer 11, the first portion being near the medium facing surface 80; a coupling layer 13 lying on a second portion of the top surface of the return pole layer 11, the second portion being located away from the medium facing surface 80; an insulating layer 14 lying on the non-illustrated insulating layer and a portion of the top surface of the return pole layer 11 other than the first and second portions; and a coil 15 lying on the insulating layer 14. The shield layer 12 and the coupling layer 13 are each formed of a magnetic material. The shield layer 12 has an end face located in the medium facing surface 80. The coil 15 is planar spiral-shaped and wound around the coupling layer 13. The coil 15 is formed of a conductive material such as copper. The insulating layer 14 is formed of alumina, for example.

The write head unit further includes an insulating layer 16 disposed around the shield layer 12, the coupling layer 13 and the coil 15 and in the space between every adjacent turns of the coil 15, and two coupling sections 17A and 17B disposed on the coupling layer 13. The coupling sections 17A and 17B are each formed of a magnetic material. Each of the coupling sections 17A and 17B has a first layer lying on the coupling layer 13, and a second and a third layer stacked in this order on the first layer. The first layer of the coupling section 17A and the first layer of the coupling section 17B are arranged to be adjacent in the track width direction (the X direction). The insulating layer 16 is formed of alumina, for example.

The write head unit further includes a dielectric layer 19 lying over the shield layer 12, the coupling layer 13, the coil 15 and the insulating layer 16. The dielectric layer 19 is formed of alumina, for example. The first layers of the coupling sections 17A and 17B are embedded in the dielectric layer 19.

The write head unit further includes a first plasmon generator 20 lying on the dielectric layer 19 in the vicinity of the medium facing surface 80, and a dielectric layer 21 lying on the dielectric layer 19 and surrounding the first plasmon generator 20. The first plasmon generator 20 is configured to excite first surface plasmons on the principle to be described later. The first plasmon generator 20 is formed of, for example, one of Au, Ag, Al, Cu, Pd, Pt, Rh and Ir, or an alloy composed of two or more of these elements. The dielectric layer 21 is formed of, for example, a material the same as that used for cladding layers to be described later. The shape and location of the first plasmon generator 20 will be described in detail later.

The write head unit further includes a waveguide including a core 23 and a cladding, the core 23 allowing light to propagate therethrough, the cladding being provided around the core 23. As shown in FIG. 1 to FIG. 3, the core 23 has a front end face 23a facing toward the medium facing surface 80, a first evanescent light generating surface 23b which is a bottom surface, a second evanescent light generating surface 23c which is a top surface, and two side surfaces 23d and 23e. The front end face 23a may be located in the medium facing surface 80 or at a distance from the medium facing surface 80. FIG. 1 to FIG. 3 show an example in which the front end face 23a is located in the medium facing surface 80.

The cladding includes cladding layers 22, 24 and 25. The cladding layer 22 lies on the first plasmon generator 20 and the dielectric layer 21. The core 23 lies on the cladding layer 22. The cladding layer 24 lies on the cladding layer 22 and surrounds the core 23. The cladding layer 25 is disposed over the second evanescent light generating surface 23c of the core 23 and the top surface of the cladding layer 24.

The core 23 is formed of a dielectric material that transmits laser light to be used for generating near-field light. The laser light emitted from a laser diode (not illustrated) enters the core 23 and propagates through the core 23. The cladding layers 22, 24 and 25 are each formed of a dielectric material that has a refractive index lower than that of the core 23. For example, the core 23 may be formed of tantalum oxide such as $Ta_2O_5$ or silicon oxynitride (SiON), whereas the cladding layers 22, 24 and 25 may be formed of silicon oxide ($SiO_2$) or alumina.

The second layers of the coupling sections 17A and 17B are embedded in the dielectric layer 21 and the cladding layers 22 and 24. The second layer of the coupling section 17A and the second layer of the coupling section 17B are located on opposite sides of the core 23 in the track width direction (the X direction) and spaced from the core 23.

The write head unit further includes a second plasmon generator 26 lying on the cladding layer 25 in the vicinity of the medium facing surface 80. The second plasmon generator 26 is configured to excite second surface plasmons on the principle to be described later. The second plasmon generator 26 is formed of, for example, the same material as that used for the first plasmon generator 20. The shape and location of the second plasmon generator 26 will be described in detail later.

The write head unit further includes: a dielectric layer 27 lying on the cladding layer 25 and surrounding the second plasmon generator 26; a dielectric layer 28 disposed to cover the second plasmon generator 26 and the dielectric layer 27; and a dielectric layer 29 lying on the dielectric layer 28 at a location away from the medium facing surface 80. The third layers of the coupling sections 17A and 17B are embedded in the cladding layer 25 and the dielectric layers 27 to 29. The dielectric layer 27 is formed of, for example, the same material as that used for the cladding layers 22, 24 and 25. The dielectric layers 28 and 29 are formed of alumina, for example.

The write head unit further includes: a main pole 30 lying on the dielectric layers 28 and 29; a coupling layer 31 formed of a magnetic material and disposed over the third layers of the coupling sections 17A and 17B and the dielectric layer 29; and a dielectric layer 32 disposed around the main pole 30 and the coupling layer 31. The top surfaces of the main pole 30, the coupling layer 31 and the dielectric layer 32 are even with each other. The dielectric layer 32 is formed of alumina, for example.

As shown in FIG. 2, the main pole 30 has an end face 30a located in the medium facing surface 80, a rear end face 30b located opposite to the end face 30a, a bottom surface 30c, a top surface 30d, a connecting surface 30e, and two side surfaces. The connecting surface 30e connects the rear end face 30b and the bottom surface 30c to each other. Further, although not illustrated, the main pole 30 may include a narrow portion and a wide portion, the narrow portion having the end face 30a and an end opposite thereto, the wide portion being connected to the end of the narrow portion. The width of the narrow portion in the track width direction (the X direction) is constant or almost constant regardless of distance from the medium facing surface 80. The width of the wide portion in the track width direction is the same as that of the narrow portion at the boundary between the narrow portion and the wide portion, and gradually increases with increasing distance from the medium facing surface 80, then becoming constant. The narrow portion has a length in the range of, for example, 0 to 0.3 μm in the direction perpendicular to the medium facing surface 80. Where the length is 0, there is no narrow portion and thus the wide portion has an end face located in the medium facing surface 80.

The write head unit further includes a coil 33 lying on the dielectric layer 32, an insulating layer 34 disposed to cover the coil 33, and a yoke layer 35 formed of a magnetic material and disposed over the main pole 30, the coupling layer 31 and the insulating layer 34. The yoke layer 35 magnetically couples the main pole 30 and the coupling layer 31 to each other. The coil 33 is planar spiral-shaped and wound around a portion of the yoke layer 35 that lies on the coupling layer 31. The coil 33 is formed of a conductive material such as copper. The insulating layer 34 is formed of alumina, for example.

The coils 15 and 33 produce magnetic fields corresponding to data to be written on the recording medium 90. The shield layer 12, the return pole layer 11, the coupling layer 13, the coupling sections 17A and 17B, the coupling layer 31, the yoke layer 35, and the main pole 30 form a magnetic path for passing magnetic fluxes corresponding to the magnetic fields produced by the coils 15 and 33. The coils 15 and 33 are connected in series or in parallel so that the magnetic flux corresponding to the magnetic field produced by the coil 15 and the magnetic flux corresponding to the magnetic field produced by the coil 33 flow in the same direction through the main pole 30. The main pole 30 passes the magnetic flux corresponding to the magnetic field produced by the coil 15 and the magnetic flux corresponding to the magnetic field produced by the coil 33, and produces a write magnetic field for use to write data on the recording medium 90 by means of a perpendicular magnetic recording system.

As shown in FIG. 4 and FIG. 5, the thermally-assisted magnetic recording head further includes a protective layer 36 disposed to cover the write head unit. The protective layer 36 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coils 15 and 33, the main pole 30, the waveguide, the first plasmon generator 20, and the second plasmon generator 26. The waveguide includes the core 23 and the cladding. The cladding includes the cladding layers 22, 24 and 25. The first plasmon generator 20, the core 23 and the second plasmon generator 26 are arranged in this order along the direction of travel of the recording medium 90 (the Z direction). The first evanescent light generating surface 23b of the core 23 faces toward the first plasmon generator 20. The second evanescent light generating surface 23c of the core 23 faces toward the second plasmon generator 26.

The main pole 30 is located on the front side in the direction of travel of the recording medium 90 relative to the core 23. The second plasmon generator 26 is located between the core 23 and the main pole 30.

The shapes and locations of the core 23, the first plasmon generator 20 and the second plasmon generator 26 will now be described in detail with reference to FIG. 1 to FIG. 3. As shown in FIG. 1 and FIG. 2, the first evanescent light generating surface 23b of the core 23 includes a first inclined portion 23b1 and a first horizontal portion 23b2, the first inclined portion 23b1 being closer to the medium facing surface 80 than the first horizontal portion 23b2. The first inclined portion 23b1 has a front end closer to the medium facing surface 80 and a rear end opposite to the front end. The front end of the first inclined portion 23b1 may be located in the medium facing surface 80 or at a distance from the medium facing surface 80. FIG. 1 to FIG. 3 show an example in which the front end of the first inclined portion 23b1 is located in the medium facing surface 80. The first horizontal portion 23b2 is connected to the rear end of the first inclined portion 23b1.

As shown in FIG. 1 and FIG. 2, the second evanescent light generating surface 23c of the core 23 includes a second inclined portion 23c1 and a second horizontal portion 23c2, the second inclined portion 23c1 being closer to the medium facing surface 80 than the second horizontal portion 23c2. The second inclined portion 23c1 has a front end closer to the medium facing surface 80 and a rear end opposite to the front end. The front end of the second inclined portion 23c1 may be located in the medium facing surface 80 or at a distance from the medium facing surface 80. FIG. 1 to FIG. 3 show an example in which the front end of the second inclined portion 23c1 is located in the medium facing surface 80. The second horizontal portion 23c2 is connected to the rear end of the second inclined portion 23c1.

As shown in FIG. 1 and FIG. 2, the first plasmon generator 20 has a first plasmon exciting section 20a which is a top surface, a bottom surface 20b, two side surfaces 20c and 20d, a first near-field light generating section 20e which is a front end face located in the medium facing surface 80, and a rear end face 20f. The first near-field light generating section 20e generates first near-field light on the principle to be described later. The first plasmon exciting section 20a is located at a predetermined distance from the first evanescent light generating surface 23b of the core 23 and faces the first evanescent light generating surface 23b. The cladding layer 22 includes a first interposition section 22a interposed between the first evanescent light generating surface 23b and the first plasmon exciting section 20a. Since the cladding layer 22 is part of the cladding, the cladding can be said to include the first interposition section 22a. In the present embodiment, the first near-field light generating section 20e has a rectangular shape, and the first plasmon generator 20 is also rectangular in cross section parallel to the medium facing surface 80.

As shown in FIG. 1 and FIG. 2, the second plasmon generator 26 has a top surface 26a, a second plasmon exciting section 26b which is a bottom surface, two side surfaces 26c and 26d, a second near-field light generating section 26e which is a front end face located in the medium facing surface 80, and a rear end face 26f. The second near-field light generating section 26e is located on the front side in the direction of travel of the recording medium 90 (the Z direction) relative to the first near-field light generating section 20e. The second near-field light generating section 26e generates second near-field light on the principle to be described later. The second plasmon exciting section 26b is located at a predetermined distance from the second evanescent light generating surface 23c of the core 23 and faces the second evanescent light generating surface 23c. The cladding layer 25 includes a second interposition section 25a interposed between the second evanescent light generating surface 23c and the second plasmon exciting section 26b. Since the cladding layer 25 is part of the cladding, the cladding can be said to include the second interposition section 25a. In the present embodiment, the second near-field light generating section 26e has a rectangular shape, and the second plasmon generator 26 is also rectangular in cross section parallel to the medium facing surface 80.

In the present embodiment, each of the first and second plasmon exciting sections 20a and 26b is a surface. As shown in FIG. 2, the first plasmon exciting section 20a includes a third inclined portion 20a1 and a third horizontal portion 20a2, the third inclined portion 20a1 being closer to the medium facing surface 80 than the third horizontal portion 20a2. The third inclined portion 20a1 is opposed to the first inclined portion 23b1 of the first evanescent light generating surface 23b, and has a front end located in the medium facing surface 80 and a rear end opposite to the front end. The third horizontal portion 20a2 is opposed to the first horizontal portion 23b2 of the first evanescent light generating surface 23b, and is connected to the rear end of the third inclined portion 20a1.

As shown in FIG. 2, the second plasmon exciting section 26b includes a fourth inclined portion 26b1 and a fourth horizontal portion 26b2, the fourth inclined portion 26b1 being closer to the medium facing surface 80 than the fourth horizontal portion 26b2. The fourth inclined portion 26b1 is opposed to the second inclined portion 23c1 of the second evanescent light generating surface 23c, and has a front end located in the medium facing surface 80 and a rear end opposite to the front end. The fourth horizontal portion 26b2 is opposed to the second horizontal portion 23c2 of the second evanescent light generating surface 23c, and is connected to the rear end of the fourth inclined portion 26b1.

Now, let us assume an imaginary straight line that passes internally through the core 23 and is parallel to the direction of travel of laser light propagating through the core 23. In FIG. 4, the arrow labeled 50 indicates the direction of travel of the laser light. In FIG. 2, the broken line labeled L represents the aforementioned imaginary straight line. The imaginary straight line L intersects the front end face 23a of the core 23. The first inclined portion 23b1 and the third inclined portion 20a1, which are respective portions of the first evanescent light generating surface 23b and the first plasmon exciting section 20a, are both inclined with respect to the imaginary straight line L such that the distance from the imaginary straight line L decreases with increasing proximity to the medium facing surface 80. In other words, the first and third inclined portions 23b1 and 20a1 are inclined such that their respective front ends are located on the trailing side, i.e., the front side in the direction of travel of the recording medium 90 (the Z direction), relative to their respective rear ends.

The second inclined portion 23c1 and the fourth inclined portion 26b1, which are respective portions of the second evanescent light generating surface 23c and the second plasmon exciting section 26b, are both inclined with respect to the imaginary straight line L such that the distance from the imaginary straight line L decreases with increasing proximity to the medium facing surface 80. In other words, the second and fourth inclined portions 23c1 and 26b1 are inclined such that their respective front ends are located on the leading side, i.e., the rear side in the direction of travel of the recording medium 90 (the Z direction), relative to their respective rear ends.

The first horizontal portion 23b2 of the first evanescent light generating surface 23b, the second horizontal portion 23c2 of the second evanescent light generating surface 23c, the third horizontal portion 20a2 of the first plasmon exciting section 20a, and the fourth horizontal portion 26b2 of the second plasmon exciting section 26b all extend substantially perpendicularly to the medium facing surface 80.

The bottom surface 20b of the first plasmon generator 20 includes a fifth inclined portion and a fifth horizontal portion, the fifth inclined portion being closer to the medium facing surface 80 than the fifth horizontal portion. In the present embodiment, in particular, the fifth inclined portion and the fifth horizontal portion are parallel or almost parallel to the third inclined portion 20a1 and the third horizontal portion 20a2 of the first plasmon exciting section 20a, respectively. The thickness (the dimension in the Z direction) of the first plasmon generator 20 is constant or almost constant regardless of distance from the medium facing surface 80. The width of the first plasmon generator 20 in the track width direction (the X direction) is constant or almost constant regardless of distance from the medium facing surface 80.

The top surface 26a of the second plasmon generator 26 includes a sixth inclined portion and a sixth horizontal portion, the sixth inclined portion being closer to the medium facing surface 80 than the sixth horizontal portion. In the present embodiment, in particular, the sixth inclined portion and the sixth horizontal portion are parallel or almost parallel to the fourth inclined portion 26b1 and the fourth horizontal portion 26b2 of the second plasmon exciting section 26b, respectively. The thickness (the dimension in the Z direction) of the second plasmon generator 26 is constant or almost constant regardless of distance from the medium facing surface 80.

As shown in FIG. 1, the second plasmon generator 26 includes a narrow portion 261 and a wide portion 262, the narrow portion 261 being in the neighborhood of the medium facing surface 80, the wide portion 262 being farther from the medium facing surface 80 than the narrow portion 261. The narrow portion 261 has a front end face located in the medium facing surface 80. The front end face of the narrow portion 261 also serves as the second near-field light generating section 26e of the second plasmon generator 26. The width of the narrow portion 261 in the track width direction (the X direction) may be constant regardless of distance from the medium facing surface 80, or may decrease with increasing proximity to the medium facing surface 80. The wide portion 262 is located on a side of the narrow portion 261 opposite from the second near-field light generating section 26e, and is coupled to the narrow portion 261. The width of the wide portion 262 is the same as that of the narrow portion 261 at the boundary between the narrow portion 261 and the wide portion 262, and gradually increases with increasing distance from the narrow portion 261, then becoming constant.

The width of the second near-field light generating section 26e in the track width direction (the X direction) is defined by the width of the narrow portion 261 in the track width direction taken in the medium facing surface 80. The width of the second near-field light generating section 26e in the track width direction falls within the range of 5 to 40 nm, for example. The height (the dimension in the Z direction) of the second near-field light generating section 26e is defined by the height of the narrow portion 261 taken in the medium facing surface 80. The height of the second near-field light generating section 26e falls within the range of 5 to 40 nm, for example.

As shown in FIG. 1 and FIG. 3, the width of the first near-field light generating section 20e in the track width direction (the X direction) is greater than the width of the second near-field light generating section 26e in the track width direction. The width of the first near-field light generating section 20e in the track width direction falls within the range of 10 to 100 nm, for example. The height (the dimension in the Z direction) of the first near-field light generating section 20e falls within the range of 5 to 40 nm, for example.

Figure 6:
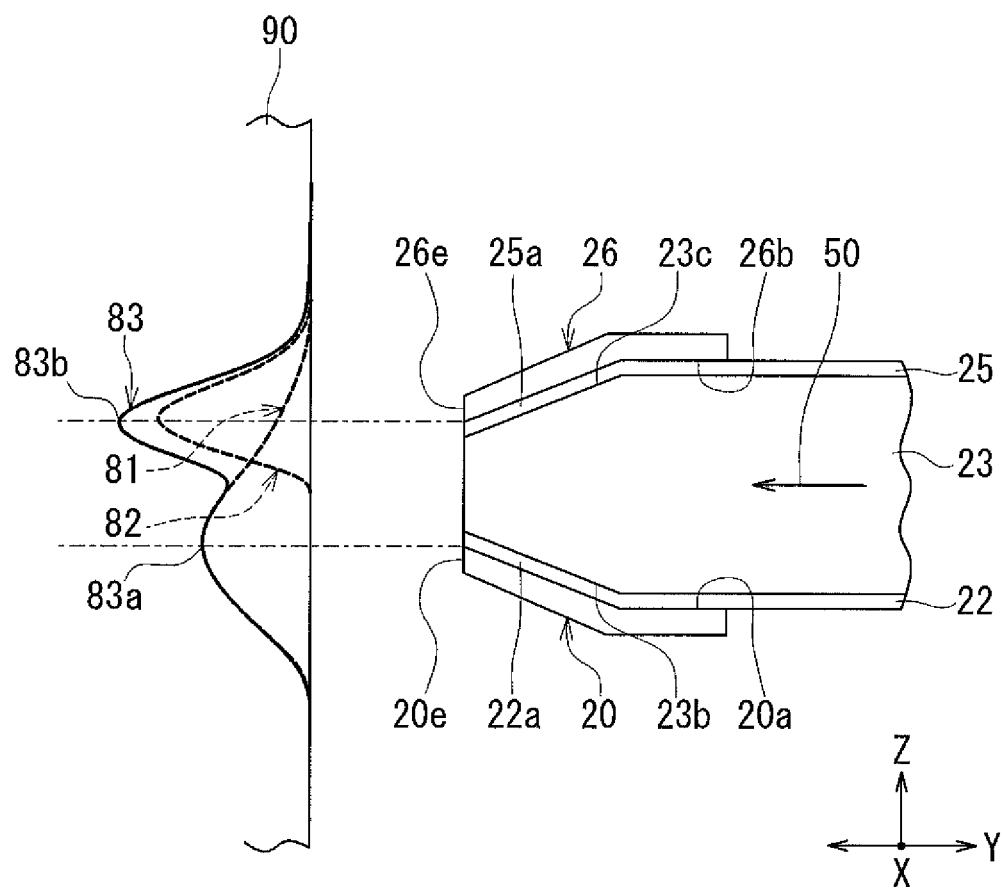
FIG. 6 is an explanatory diagram for explaining the operations of the first and second plasmon generators of the first embodiment of the invention.

Now, the principle of generation of near-field light in the present embodiment and the principle of thermally-assisted magnetic recording using near-field light will be described in detail with reference to FIG. 2, FIG. 4 and FIG. 6. FIG. 6 is an explanatory diagram for explaining the operations of the first and second plasmon generators 20 and 26. Laser light emitted from a laser diode (not illustrated) enters the core 23. As shown in FIG. 4 and FIG. 6, the laser light 50 propagates through the core 23 toward the medium facing surface 80, and reaches the vicinity of the first and second plasmon generators 20 and 26. In the core 23, the laser light 50 is totally reflected at the first evanescent light generating surface 23b to generate first evanescent light permeating into the first interposition section 22a. In the first plasmon generator 20, first surface plasmons are excited on the first plasmon exciting section 20a through coupling with the first evanescent light. The first surface plasmons propagate to the first near-field light generating section 20e, and the first near-field light generating section 20e generates first near-field light based on the first surface plasmons.

In the core 23, the laser light 50 is totally reflected at the second evanescent light generating surface 23c to generate second evanescent light permeating into the second interposition section 25a. In the second plasmon generator 26, second surface plasmons are excited on the second plasmon exciting section 26b through coupling with the second evanescent light. The second surface plasmons propagate to the second near-field light generating section 26e, and the second near-field light generating section 26e generates second near-field light based on the second surface plasmons.

The first near-field light generated by the first near-field light generating section 20e is projected toward the recording medium 90, reaches the surface of the recording medium 90 and preheats a portion of a magnetic recording layer of the recording medium 90. On the recording medium 90, a spot of the first near-field light creates such a temperature distribution that the temperature peaks at the center of the spot and decreases with increasing distance from the center. Hereinafter, a temperature distribution that is created on the recording medium 90 by a spot of the first near-field light upon irradiation of the recording medium 90 with the first near-field light alone, the temperature distribution being in the Z direction or the direction in which the tracks extend, will be referred to as the first temperature distribution. In FIG. 6, the curve labeled 81 represents the first temperature distribution. As shown in FIG. 6, a location on the recording medium 90 that is to be irradiated with the second near-field light, i.e., a location on the recording medium 90 in the vicinity of the second near-field light generating section 26e, is also raised in temperature by the first near-field light.

The second near-field light generated by the second near-field light generating section 26e is projected toward the recording medium 90, reaches the surface of the recording medium 90 and further heats the preheated portion of the magnetic recording layer of the recording medium 90. On the recording medium 90, a spot of the second near-field light creates such a temperature distribution that the temperature peaks at the center of the spot and decreases with increasing distance from the center, as in the case of the first near-field light. Hereinafter, a temperature distribution that is created on the recording medium 90 by a spot of the second near-field light upon irradiation of the recording medium 90 with the second near-field light alone, the temperature distribution being in the Z direction or the direction in which the tracks extend, will be referred to as the second temperature distribution. In FIG. 6, the curve labeled 82 represents the second temperature distribution.

A temperature distribution that is created on the recording medium 90 by a spot of the first near-field light and a spot of the second near-field light upon simultaneous irradiation of the recording medium 90 with the first near-field light and the second near-field light, the temperature distribution being in the Z direction or the direction in which the tracks extend, will be referred to as the third temperature distribution. In FIG. 6, the curve labeled 83 represents the third temperature distribution. The third temperature distribution 83 includes a first peak 83a and a second peak 83b, for example. The first peak 83a results mainly from the peak of the first temperature distribution 81. The second peak 83b results mainly from the peak of the second temperature distribution 82. As shown in FIG. 6, the temperature at the second peak 83b is higher than the temperature at the peak of the second temperature distribution 82 due to the preheating effect of the first near-field light. Thus, according to the present embodiment, the first near-field light preheats a portion of the magnetic recording layer of the recording medium 90, and the second near-filed light further heats the preheated portion of the magnetic recording layer of the recording medium 90 to a required temperature.

The portion of the magnetic recording layer of the recording medium 90 drops in coercivity upon being heated by the first and second near-field light. In thermally-assisted magnetic recording, the portion of the magnetic recording layer with the lowered coercivity is subjected to a write magnetic field produced by the main pole 30 for data writing.

According to the present embodiment, the above-described operations of the first and second plasmon generators 20 and 26 make it possible to apply a sufficient amount of heat to the recording medium 90 and to suppress temperature increases of the first and second plasmon generators 20 and 26. Such advantageous effects will now be discussed with reference to a thermally-assisted magnetic recording head of a comparative example.

The thermally-assisted magnetic recording head of the comparative example has a single plasmon generator 126 instead of the first and second plasmon generators 20 and 26 of the present embodiment. The plasmon generator 126 is the same as the second plasmon generator 26 in shape and location. The plasmon generator 126 has a plasmon exciting section 126b which is a bottom surface, and a near-field light generating section 126e which is a front end face located in the medium facing surface 80. The plasmon exciting section 126b is located at a predetermined distance from the second evanescent light generating surface 23c of the core 23 and faces the second evanescent light generating surface 23c. The thermally-assisted magnetic recording head of the comparative example is otherwise configured in the same manner as the thermally-assisted magnetic recording head according to the present embodiment.

Figure 7:
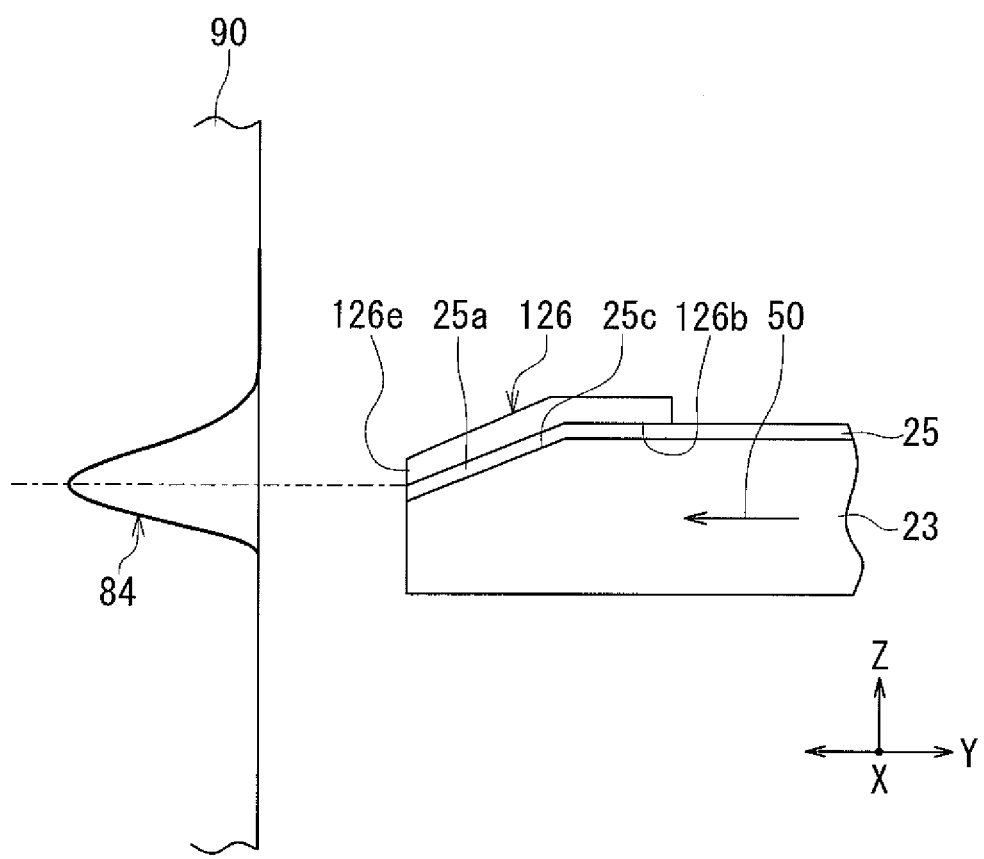
FIG. 7 is an explanatory diagram for explaining the operation of a plasmon generator of a thermally-assisted magnetic recording head of a comparative example.

FIG. 7 is an explanatory diagram for explaining the operation of the plasmon generator 126 of the thermally-assisted magnetic recording head of the comparative example. The principle of generation of near-field light in the comparative example is the same as the principle of generation of the second near-field light in the present embodiment. More specifically, in the core 23, laser light 50 is totally reflected at the second evanescent light generating surface 23c to generate evanescent light permeating into the second interposition section 25a. In the plasmon generator 126, surface plasmons are excited on the plasmon exciting section 126b through coupling with the aforementioned evanescent light. The surface plasmons propagate to the near-field light generating section 126e, and the near-field light generating section 126e generates near-field light based on the surface plasmons. On the recording medium 90, a spot of the near-field light generated by the near-field light generating section 126e creates such a temperature distribution that the temperature peaks at the center of the spot and decreases with increasing distance from the center. In FIG. 7, the curve labeled 84 represents the temperature distribution created on the recording medium 90 by a spot of the near-field light generated by the near-field light generating section 126e, the temperature distribution being in the Z direction or the direction in which the tracks extend.

For the comparative example, the single plasmon generator 126 must heat the recording medium 90 to a required temperature. The comparative example thus requires that the power of the laser light 50 be increased to allow the plasmon generator 126 to generate near-field light of sufficient intensity. However, increasing the power of the laser light 50 may result in a significant increase in temperature of the plasmon generator 126, and may consequently cause the plasmon generator 126 to be deformed or broken. To prevent this, the power of the laser light 50 could be reduced to allow the plasmon generator 126 to generate a small amount of heat; but this would lead to the problem that the near-field light generated by the plasmon generator 126 is low in intensity and thus unable to apply a sufficient amount of heat to the recording medium 90.

According to the present embodiment, in contrast, the first near-field light generated by the first plasmon generator 20 is used to preheat the recording medium 90 and the second near-field light generated by the second plasmon generator 26 is used to further heat the preheated recording medium 90 to a required temperature, as described above. According to the present embodiment, it suffices that the required temperature is reached at the second peak 83b of the third temperature distribution 83 shown in FIG. 6, and neither of the peaks of the first and second temperature distributions 81 and 82 need to reach the required temperature. Thus, according to the present embodiment, the intensity of each of the first and second near-field light may be lower than the intensity of the near-field light of the comparative example. The present embodiment thus allows the laser light 50 to be lower in power and thereby allows for a reduction in the amount of heat to be generated by each of the first and second plasmon generators 20 and 26 when compared with the comparative example.

Further, the present embodiment allows for efficient use of the power of the laser light 50 since the two evanescent light generating surfaces 23b and 23b provided in the single core 23 are used to allow the two plasmon generators 20 and 26 to generate near-field light. It is thereby possible to heat a portion of the magnetic recording layer of the recording medium 90 to a required temperature with the power of the laser light 50 reduced when compared with the comparative example.

Consequently, the present embodiment makes it possible to apply a sufficient amount of heat to the recording medium 90 and to suppress temperature increases of the first and second plasmon generators 20 and 26.

To achieve a smaller track width, it is preferable that the second near-field light generated by the second plasmon generator 26 be smaller in spot diameter. A smaller spot diameter of the second near-field light can be achieved by, for example, reducing the width of the second near-field light generating section 26e of the second plasmon generator 26 in the track width direction. Reducing the width of the second near-field light generating section 26e in the track width direction increases the degree of concentration of the second surface plasmons on the second near-field light generating section 26e, and consequently allows for a reduction in the spot diameter of the second near-field light.

On the other hand, to enhance the preheating effect provided by the first plasmon generator 20, the first temperature distribution 81 preferably has a larger extent than that of the second temperature distribution 82, as shown in FIG. 6. The first temperature distribution 81 having a larger extent serves to achieve a higher temperature at the location on the recording medium 90 to be irradiated with the second near-field light. Making the first temperature distribution 81 larger in extent than the second temperature distribution 82 can be achieved by, for example, making the first near-field light generating section 20e of the first plasmon generator 20 greater in width in the track width direction than the second near-field light generating section 26e of the second plasmon generator 26.

Further, in the present embodiment, the first inclined portion 23b1 and the third inclined portion 20a1, which are respective portions of the first evanescent light generating surface 23b and the first plasmon exciting section 20a, are both inclined with respect to the imaginary straight line L such that the distance from the imaginary straight line L decreases with increasing proximity to the medium facing surface 80. This allows the first near-field light generating section 20e and the second near-field light generating section 26e to be at a smaller distance from each other when compared with the case where the entire first evanescent light generating surface 23b and the entire first plasmon exciting section 20a are each parallel to the direction of travel of the laser light 50 propagating through the core 23. The present embodiment thereby allows for a reduction in the distance between the first peak 83a and the second peak 83b. This also contributes to enhancement of the preheating effect provided by the first plasmon generator 20.

Likewise, in the present embodiment, the second inclined portion 23c1 and the fourth inclined portion 26b 1, which are respective portions of the second evanescent light generating surface 23c and the second plasmon exciting section 26b, are both inclined with respect to the imaginary straight line L such that the distance from the imaginary straight line L decreases with increasing proximity to the medium facing surface 80. This allows the first near-field light generating section 20e and the second near-field light generating section 26e to be at a smaller distance from each other when compared with the case where the entire second evanescent light generating surface 23c and the entire second plasmon exciting section 26b are each parallel to the direction of travel of the laser light 50 propagating through the core 23. The present embodiment thereby allows for a reduction in the distance between the first peak 83a and the second peak 83b. This also contributes to enhancement of the preheating effect provided by the first plasmon generator 20.

Further, the present embodiment enables a larger amount of the laser light 50 propagating through the core 23 to reach the first evanescent light generating surface 23b when compared with the case where the entire first evanescent light generating surface 23b and the entire first plasmon exciting section 20a are each parallel to the direction of travel of the laser light 50 propagating through the core 23. This enhances the efficiency of use of the laser light 50, thereby allowing for a reduction in the power of the laser light 50.

Similarly, the present embodiment enables a larger amount of the laser light 50 propagating through the core 23 to reach the second evanescent light generating surface 23c when compared with the case where the entire second evanescent light generating surface 23c and the entire second plasmon exciting section 26b are each parallel to the direction of travel of the laser light 50 propagating through the core 23. This enhances the efficiency of use of the laser light 50, thereby allowing for a reduction in the power of the laser light 50.

To enhance the efficiency of use of the laser light 50 as mentioned above, each of the first to fourth inclined portions 23b1, 20a1, 23c1 and 26b1 needs to form an angle of a certain magnitude with respect to the imaginary straight line L. Specifically, the angle that each of the first to fourth inclined portions 23b1, 20a1, 23c1 and 26b1 forms with respect to the imaginary straight line L, which will hereinafter be referred to as the inclination angle, is preferably 10° or greater. On the other hand, if the inclination angle is excessively great, the laser light 50 fails to be totally reflected at the first and second inclined portions 23b1 and 23c1, so that part of the laser light 50 passes through the first and second interposition sections 22a and 25a and directly reaches the third and fourth inclined portions 20a1 and 26b1. In such a case, there will occur the various problems associated with the configuration in which a plasmon generator is directly irradiated with laser light to excite plasmons on the plasmon generator. To avoid this, the inclination angle should preferably be 35° or smaller, and more preferably, 20° or smaller. In view of the foregoing, the inclination angle should preferably be in the range of 10° to 35°, and more preferably in the range of 10° to 20°.

A manufacturing method for the thermally-assisted magnetic recording head according to the present embodiment will now be described. The manufacturing method for the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The manufacturing method for the thermally-assisted magnetic recording head according to the present embodiment will be described in more detail below with attention focused on a single thermally-assisted magnetic recording head. The manufacturing method for the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. The shield layer 12 and the coupling layer 13 are then formed on the return pole layer 11 at the locations of the two openings. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, the first layers of the coupling sections 17A and 17B are formed on the coupling layer 13. Then, the dielectric layer 19 is formed over the entire top surface of the stack. The dielectric layer 19 is then polished by, for example, CMP, until the first layers of the coupling sections 17A and 17B are exposed.

Reference is now made to FIG. 8A to FIG. 13B to describe steps to be performed after the polishing of the dielectric layer 19 up to the formation of the dielectric layer 32. FIG. 8A to FIG. 13B each show a stack of layers formed in the process of manufacturing the thermally-assisted magnetic recording head. FIG. 8A to FIG. 13B omit the illustration of portions located below the dielectric layer 19. FIG. nA (n is an integer between 8 and 13 inclusive) shows a cross section that intersects the end face 30a of the main pole 30 and that is perpendicular to the medium facing surface 80 and to the top surface 1a of the substrate 1. FIG. nB shows a cross section of the stack taken at the location at which the medium facing surface 80 is to be formed.

Figure 8A:
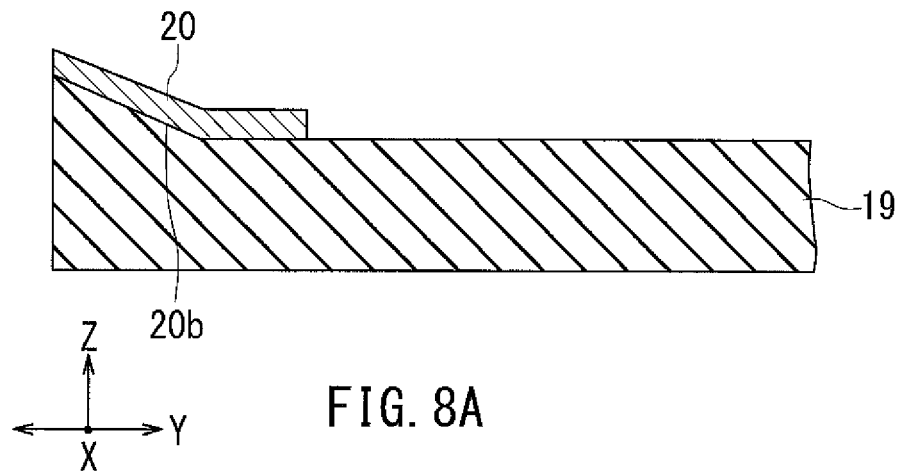
FIG. 8A and FIG. 8B are cross-sectional views showing a step of a manufacturing method for the thermally-assisted magnetic recording head according to the first embodiment of the invention.
Figure 8B:
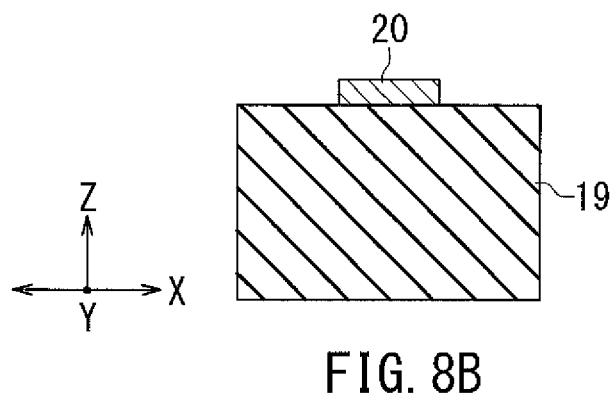

FIG. 8A and FIG. 8B show a step that follows the polishing of the dielectric layer 19. In this step, first, a portion of the dielectric layer 19 is etched by, for example, ion beam etching (hereinafter referred to as IBE) so as to provide the top surface of the dielectric layer 19 with an inclined portion and a horizontal portion that are to be respectively opposed to the fifth inclined portion and the fifth horizontal portion of the bottom surface 20b of the first plasmon generator 20 to be formed later. The first layers of the coupling sections 17A and 17B (see FIG. 4) are also etched in part by this etching. Next, the first plasmon generator 20 is formed on the dielectric layer 19. The first plasmon generator 20 is formed by, for example, forming a metal film on the dielectric layer 19 and then patterning the metal film by etching a portion thereof.

Figure 9A:
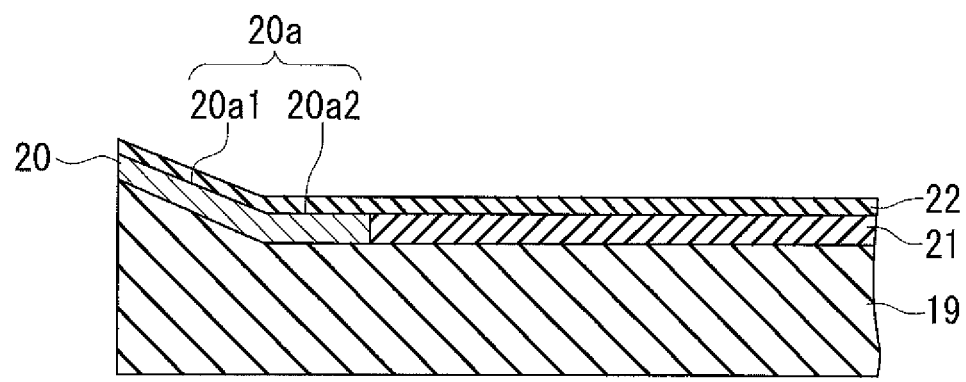
FIG. 9A and FIG. 9B are cross-sectional views showing a step that follows the step shown in FIG. 8A and FIG. 8B.
Figure 9B:
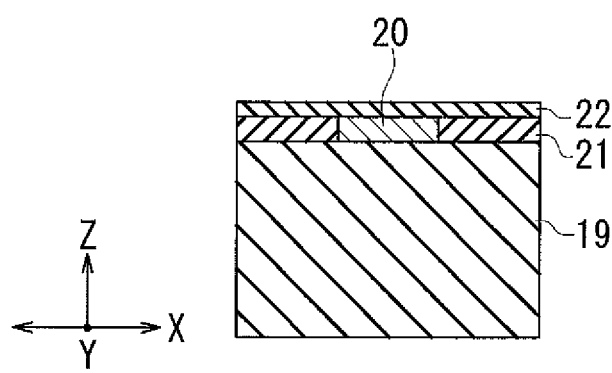

FIG. 9A and FIG. 9B show the next step. In this step, first, the dielectric layer 21 is formed over the entire top surface of the stack. The dielectric layer 21 is then etched in part by, for example, IBE, so as to expose the third inclined portion 20a1 of the first plasmon exciting section 20a of the first plasmon generator 20. Then, the cladding layer 22 is formed over the entire top surface of the stack.

Figure 10A:
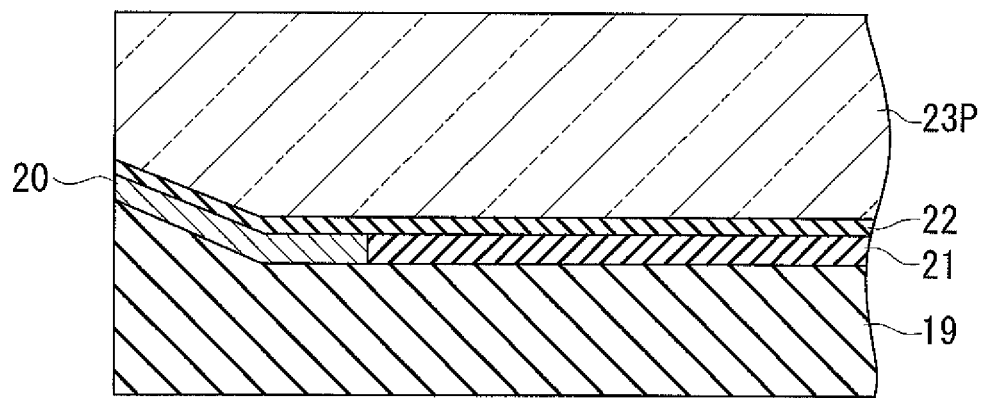
FIG. 10A and FIG. 10B are cross-sectional views showing a step that follows the step shown in FIG. 9A and FIG. 9B.
Figure 10B:
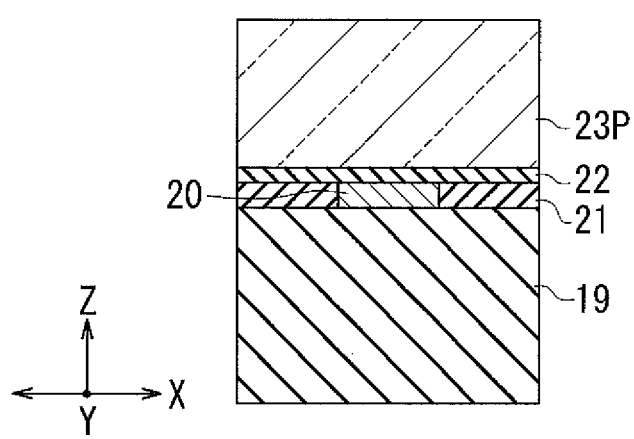

FIG. 10A and FIG. 10B show the next step. In this step, first, a dielectric layer 23P, which will later become the core 23, is formed over the entire top surface of the stack. The dielectric layer 23P is then patterned by etching a portion thereof by reactive ion etching (hereinafter referred to as RIE), for example. The planar shape (the shape as viewed from above) of the dielectric layer 23P patterned is the same as that of the core 23. Next, the dielectric layer 21 and the cladding layer 22 are selectively etched to form therein two openings for exposing the top surfaces of the first layers of the coupling sections 17A and 17B (see FIG. 4). Then, the second layers of the coupling sections 17A and 17B are formed on the first layers of the coupling sections 17A and 17B, respectively. The cladding layer 24 (see FIG. 5) is then formed over the entire top surface of the stack. The cladding layer 24 is then polished by, for example, CMP, until the dielectric layer 23P and the second layers of the coupling sections 17A and 17B are exposed.

Figure 11A:
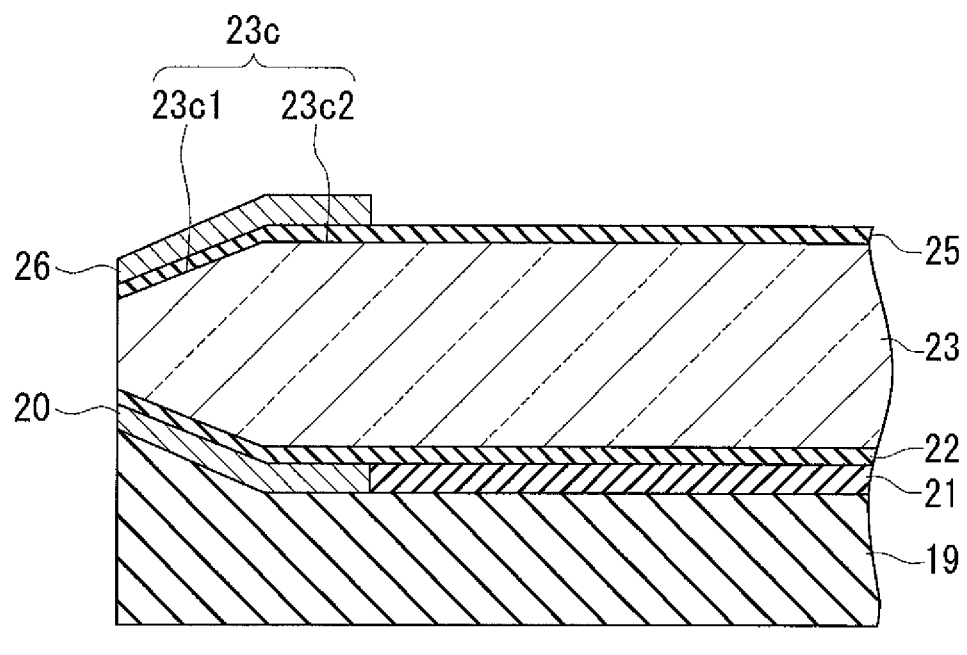
FIG. 11A and FIG. 11B are cross-sectional views showing a step that follows the step shown in FIG. 10A and FIG. 10B.
Figure 11B:
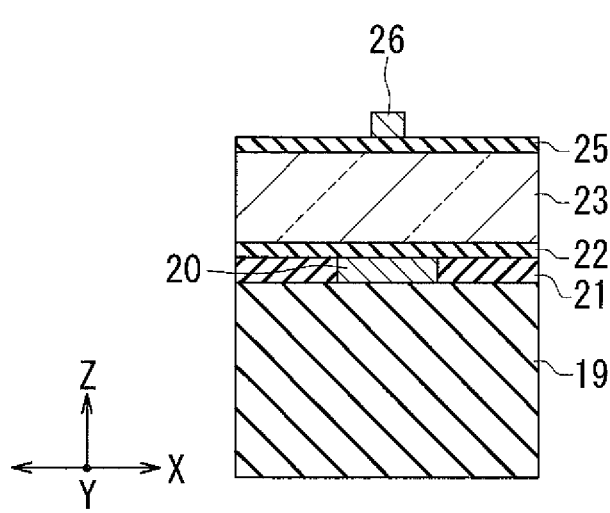

FIG. 11A and FIG. 11B show the next step. In this step, first, portions of the dielectric layer 23P and the cladding layer 24 are taper-etched by, for example, RIE or IBE so as to provide the dielectric layer 23P with the second inclined portion 23c1. A portion of the top surface of the dielectric layer 23P that remains unetched makes the second horizontal portion 23c2. The dielectric layer 23P is thereby made into the core 23. Next, the cladding layer 25 is formed over the entire top surface of the stack. The second plasmon generator 26 is then formed on the cladding layer 25. The second plasmon generator 26 is formed by, for example, forming a metal film on the cladding layer 25 and then patterning the metal film by etching a portion thereof.

Figure 12A:
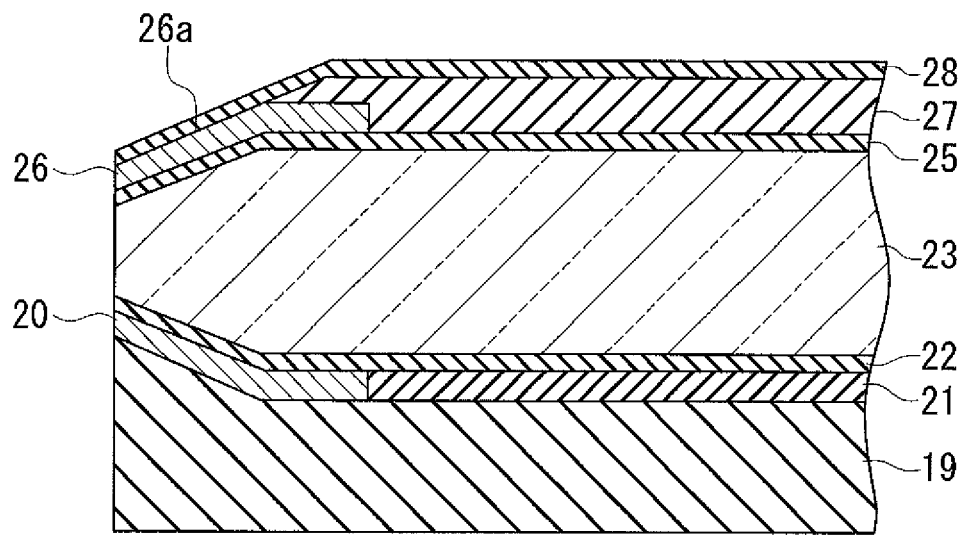
FIG. 12A and FIG. 12B are cross-sectional views showing a step that follows the step shown in FIG. 11A and FIG. 11B.
Figure 12B:
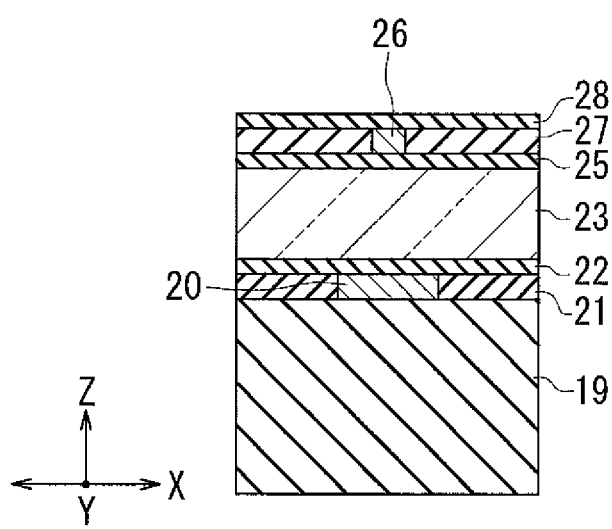

FIG. 12A and FIG. 12B show the next step. In this step, first, the dielectric layer 27 is formed over the entire top surface of the stack. The dielectric layer 27 is then etched in part by, for example, IBE, so as to expose the sixth inclined portion of the top surface 26a of the second plasmon generator 26. Next, the dielectric layer 28 is formed over the entire top surface of the stack.

Figure 13A:
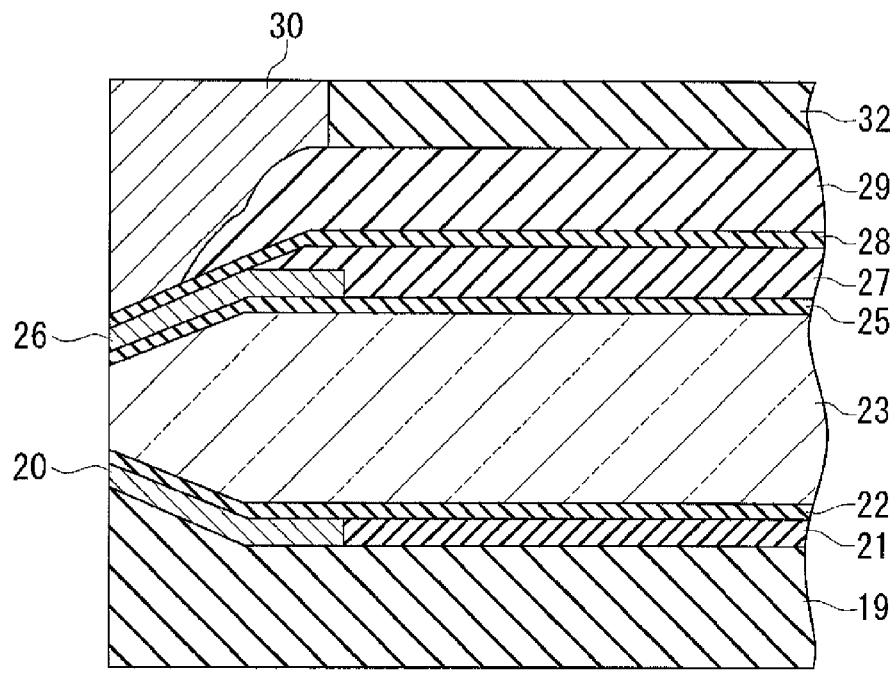
FIG. 13A and FIG. 13B are cross-sectional views showing a step that follows the step shown in FIG. 12A and FIG. 12B.
Figure 13B:
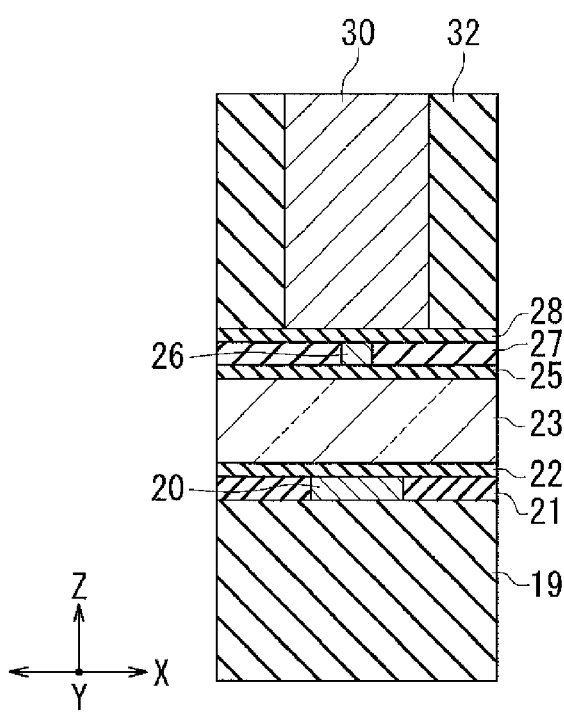

FIG. 13A and FIG. 13B show the next step. In this step, first, the dielectric layer 29 is formed on the dielectric layer 28. The cladding layer 25 and the dielectric layers 27 to 29 are then selectively etched to form therein two openings for exposing the top surfaces of the second layers of the coupling sections 17A and 17B (see FIG. 4). Next, the third layers of the coupling sections 17A and 17B are formed on the second layers of the coupling sections 17A and 17B, respectively. Then, the main pole 30 is formed over the dielectric layers 28 and 29, and the coupling layer 31 (see FIG. 4) is formed over the third layers of the coupling sections 17A and 17B and the dielectric layer 29. Next, the dielectric layer 32 is formed over the entire top surface of the stack. The dielectric layer 32 is then polished by, for example, CMP, until the main pole 30 and the coupling layer 31 are exposed, whereby the top surfaces of the main pole 30, the coupling layer 31 and the dielectric layer 32 are made even with each other.

Now, steps to follow the polishing of the dielectric layer 32 will be described with reference to FIGS. 4 and 5. First, the coil 33 is formed on the dielectric layer 32. Then, the insulating layer 34 is formed to cover the coil 33. Next, the yoke layer 35 is formed over the main pole 30, the coupling layer 31 and the insulating layer 34. The protective layer 36 is then formed to cover the yoke layer 35. Wiring, terminals, and other components are then formed on the top surface of the protective layer 36. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

Second Embodiment

Figure 14:
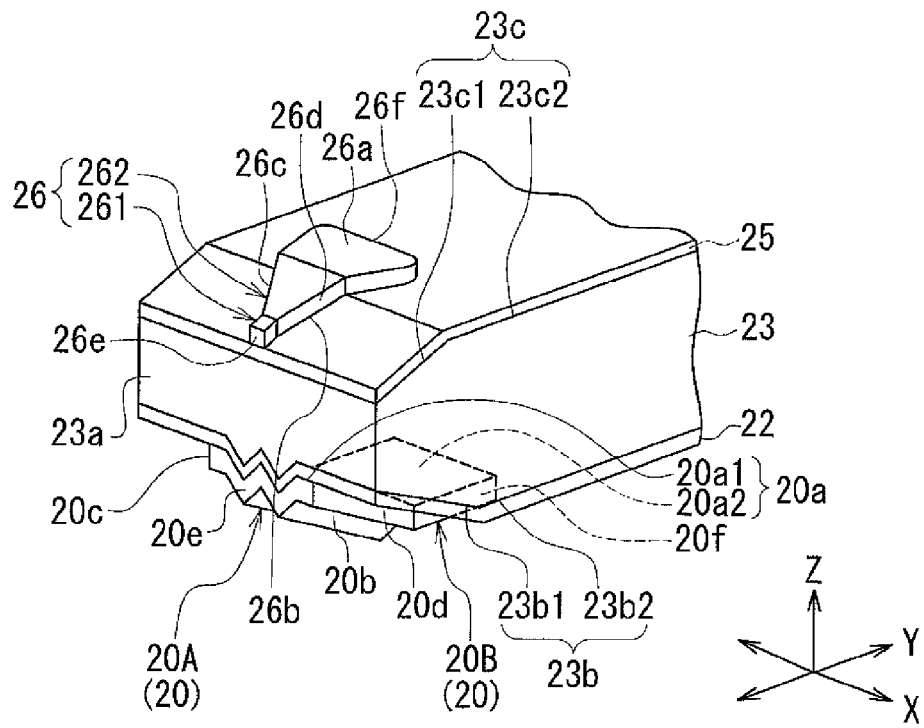
FIG. 14 is a perspective view showing the main part of a thermally-assisted magnetic recording head according to a second embodiment of the invention.
Figure 15:
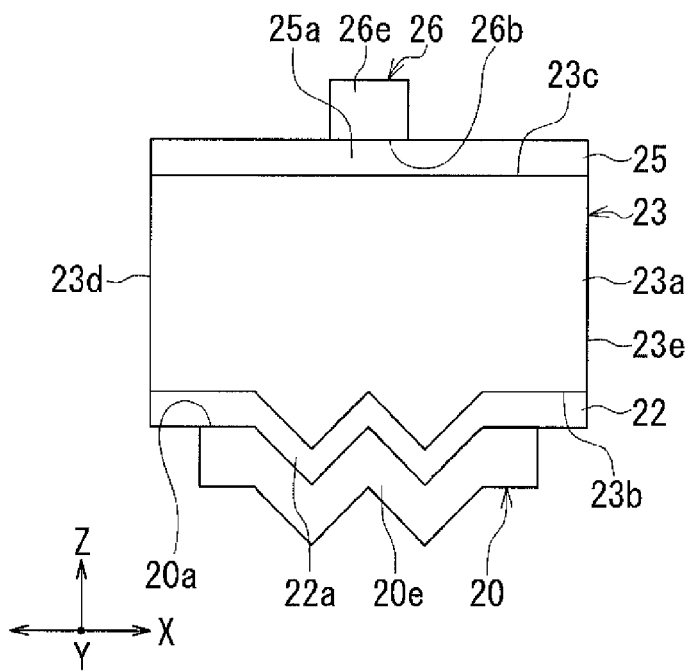
FIG. 15 is a front view showing the core, the first plasmon generator, and the second plasmon generator of the second embodiment of the invention.

A thermally-assisted magnetic recording head according to a second embodiment of the invention will now be described with reference to FIG. 14 and FIG. 15. FIG. 14 is a perspective view showing the main part of the thermally-assisted magnetic recording head according to the present embodiment. FIG. 15 is a front view showing the core, the first plasmon generator and the second plasmon generator of the present embodiment. The thermally-assisted magnetic recording head according to the present embodiment differs from the thermally-assisted magnetic recording head according to the first embodiment in the following ways. In the present embodiment, the first near-field light generating section 20e of the first plasmon generator 20 has a zigzag shape. In the example shown in FIG. 14 and FIG. 15, the first near-field light generating section 20e is basically shaped to be long in the track width direction (the X direction), being bent at a plurality of points (five points in the example shown in FIG. 15) between opposite ends thereof.

A portion of the first plasmon generator 20 that extends from the medium facing surface 80 to the boundary between the third inclined portion 20a1 and the third horizontal portion 20a2 of the first plasmon exciting section 20a will be referred to as the front portion and denoted by symbol 20A. The remaining portion of the first plasmon generator 20 other than the front portion 20A will be referred to as the rear portion and denoted by symbol 20B. A cross section of the front portion 20A parallel to the medium facing surface 80 has the same zigzag shape as the first near-field light generating section 20e. The rear portion 20B is rectangular in cross section parallel to the medium facing surface 80.

As shown in FIG. 14, the third inclined portion 20a1 of the first plasmon exciting section 20a is formed into a surface having a plurality of triangular-wave-like undulations due to the shape of the first near-field light generating section 20e and the shape of a cross section of the front portion 20A parallel to the medium facing surface 80. Further, in the present embodiment, a part of the first inclined portion 23b1 of the first evanescent light generating surface 23b of the core 23 that is opposed to the third inclined portion 23a1 is shaped like a transferred form of the third inclined portion 20a1.

In the present embodiment, the first near-field light generating section 20e is provided with a plurality of corners at different locations from each other due to the zigzag shape. Surface plasmons tend to concentrate at the plurality of corners. Accordingly, a plurality of spots of near-field light are formed on the recording medium 90 in the vicinity of the plurality of corners. Those plurality of spots merge to create an intensity distribution of the first near-field light on the recording medium 90, the intensity distribution of the first near-field light having a larger extent than that of the intensity distribution of the second near-field light generated by the second plasmon generator 26. The present embodiment thereby allows the first temperature distribution 81 to be larger in extent than the second temperature distribution 82 as shown in FIG. 6, thus allowing for enhancement of the preheating effect provided by the first plasmon generator 20.

A manufacturing method for the thermally-assisted magnetic recording head according to the present embodiment will now be described with reference to FIG. 16A to FIG. 18B. FIG. 16A to FIG. 18B each show a stack of layers formed in the process of manufacturing the thermally-assisted magnetic recording head. FIG. 16A to FIG. 18B omit the illustration of portions located below the dielectric layer 19. FIG. nA (n is an integer between 16 and 18 inclusive) shows a cross section that intersects the end face 30a (see FIG. 2) of the main pole 30 and that is perpendicular to the medium facing surface 80 and to the top surface 1a (see FIG. 4 and FIG. 5) of the substrate 1. FIG. nB shows a cross section of the stack taken at the location at which the medium facing surface 80 is to be formed.

Figure 16A:
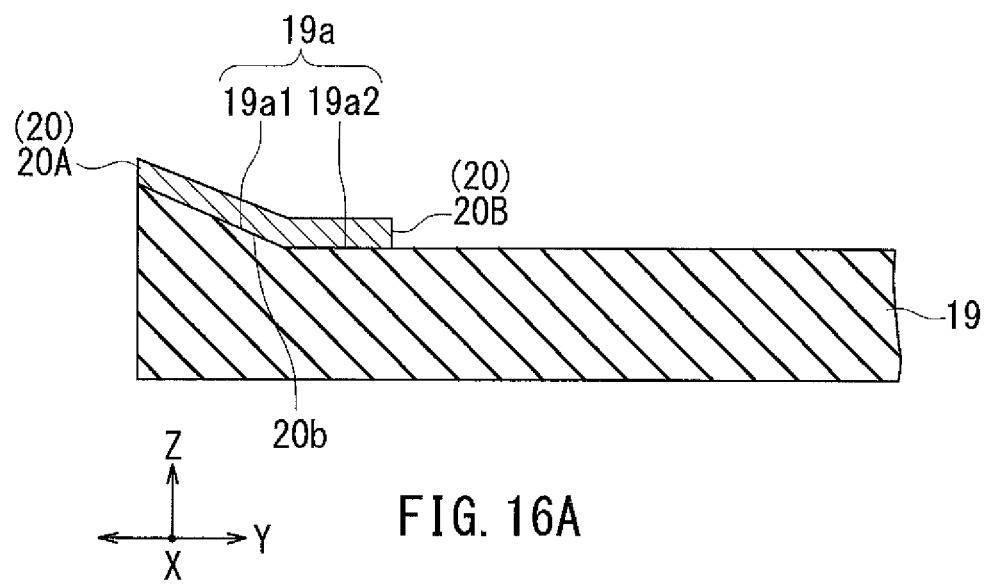
FIG. 16A and FIG. 16B are cross-sectional views showing a step of a manufacturing method for the thermally-assisted magnetic recording head according to the second embodiment of the invention.
Figure 16B:
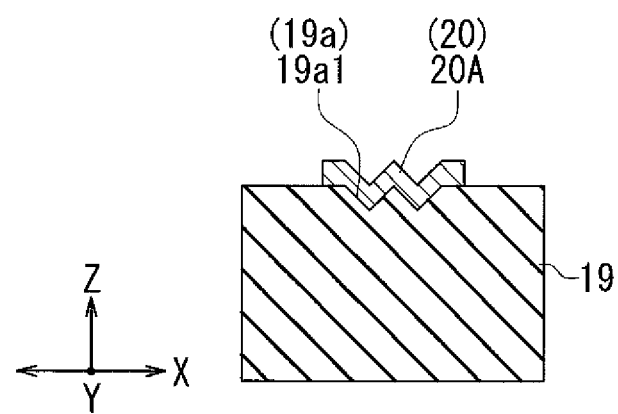

The manufacturing method for the thermally-assisted magnetic recording head according to the present embodiment is the same as the method according to the first embodiment up to the step of polishing the dielectric layer 19. FIG. 16A and FIG. 16B show a step that follows the polishing of the dielectric layer 19. In this step, first, a portion of the dielectric layer 19 is etched by, for example, IBE, so as to provide the top surface 19a of the dielectric layer 19 with an inclined portion 19a1 and a horizontal portion 19a2 that are to be respectively opposed to the fifth inclined portion and the fifth horizontal portion of the bottom surface 20b of the first plasmon generator 20 to be formed later. The first layers of the coupling sections 17A and 17B (see FIG. 4) are also etched in part by this etching. The inclined portion 19a1 of the top surface 19a of the dielectric layer 19 is then subjected to, for example, focused ion beam etching, to thereby form a plurality of triangular-wave-like undulations.

Next, the first plasmon generator 20 is formed on the dielectric layer 19. The first plasmon generator 20 is formed by, for example, forming a metal film on the dielectric layer 19 and then patterning the metal film by etching a portion thereof. In the present embodiment, in particular, the front portion 20A of the first plasmon generator 20 is formed on the plurality of triangular-wave-like undulations of the inclined portion 19a1 of the top surface 19a of the dielectric layer 19. As a result, the front portion 20A becomes zigzag-shaped in cross section parallel to the medium facing surface 80, and the first near-field light generating section 20e to be formed later will also have a zigzag shape.

Figure 17A:
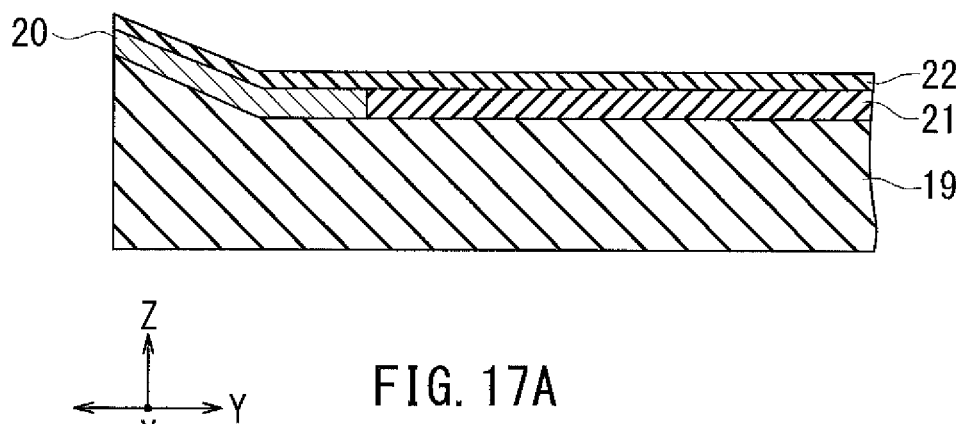
FIG. 17A and FIG. 17B are cross-sectional views showing a step that follows the step shown in FIG. 16A and FIG. 16B.
Figure 17B:
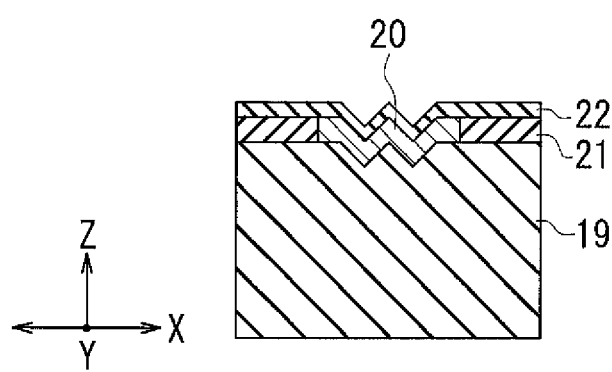

FIG. 17A and FIG. 17B show the next step. In this step, the dielectric layer 21 and the cladding layer 22 are formed in the same manner as in the step of FIG. 9A and FIG. 9B in the first embodiment. In the present embodiment, in particular, the top surface of a portion of the cladding layer 22 lying above the front portion 20A of the first plasmon generator 20 is provided with a plurality of triangular-wave-like undulations.

Figure 18A:
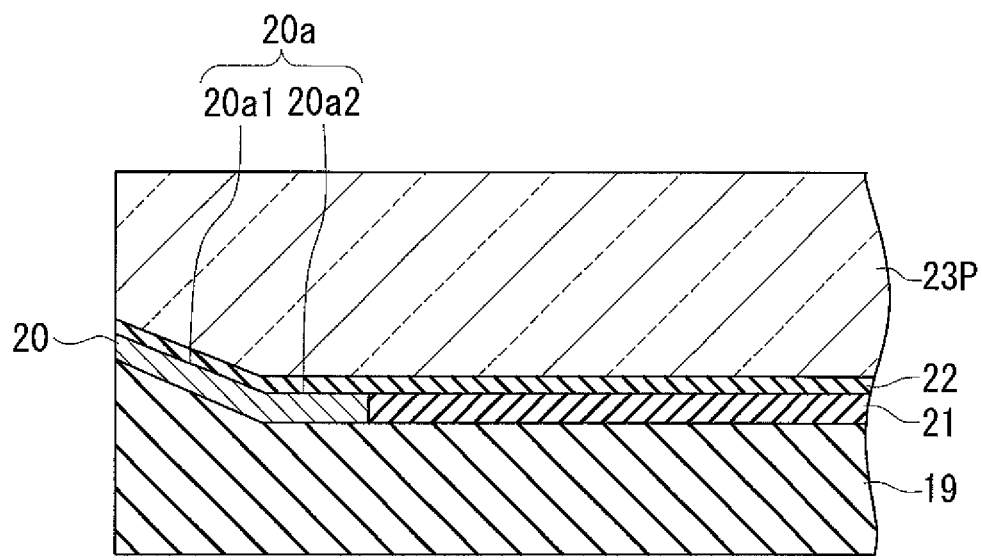
FIG. 18A and FIG. 18B are cross-sectional views showing a step that follows the step shown in FIG. 17A and FIG. 17B.
Figure 18B:
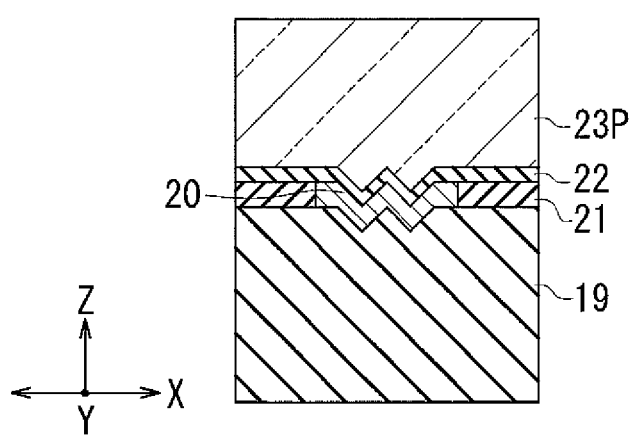

FIG. 18A and FIG. 18B show the next step. In this step, the dielectric layer 23P which will later become the core 23, the second layers of the coupling sections 17A and 17B, and the cladding layer 24 are formed in the same manner as in the step of FIG. 10A and FIG. 10B in the first embodiment. In the present embodiment, in particular, a portion of the bottom surface of the dielectric layer 23P that is opposed to the third inclined portion 20a1 is provided with a plurality of triangular-wave-like undulations, as is the third inclined portion 20a1. This portion of the bottom surface of the dielectric layer 23P will later become part of the first inclined portion 23b1 of the first evanescent light generating surface 23b of the core 23. The subsequent steps are the same as those of the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the core 23, the first plasmon generator 20 and the second plasmon generator 26 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
- a medium facing surface configured to face a recording medium;
- a main pole having an end face located in the medium facing surface, the main pole producing a write magnetic field for use to write data on the recording medium;
- a waveguide including a core and a cladding, the core allowing light to propagate therethrough, the cladding being provided around the core;
- a first plasmon generator having a first plasmon exciting section and a first near-field light generating section; and
- a second plasmon generator having a second plasmon exciting section and a second near-field light generating section, wherein the first plasmon generator, the core and the second plasmon generator are arranged in this order along a direction of travel of the recording medium, the first near-field light generating section and the second near-field light generating section are located in the medium facing surface, the second near-field light generating section is located on a front side in the direction of travel of the recording medium relative to the first near-field light generating section, the core has a first evanescent light generating surface facing toward the first plasmon generator, and a second evanescent light generating surface facing toward the second plasmon generator, the first plasmon exciting section is located at a predetermined distance from the first evanescent light generating surface and faces the first evanescent light generating surface, the second plasmon exciting section is located at a predetermined distance from the second evanescent light generating surface and faces the second evanescent light generating surface, the cladding includes a first interposition section and a second interposition section, the first interposition section being interposed between the first evanescent light generating surface and the first plasmon exciting section, the second interposition section being interposed between the second evanescent light generating surface and the second plasmon exciting section, the first evanescent light generating surface is configured to generate first evanescent light based on the light propagating through the core, the second evanescent light generating surface is configured to generate second evanescent light based on the light propagating through the core, the first plasmon generator is configured so that a first surface plasmon is excited on the first plasmon exciting section through coupling with the first evanescent light generated by the first evanescent light generating surface, the first surface plasmon propagates to the first near-field light generating section, and the first near-field light generating section generates first near-field light based on the first surface plasmon, and the second plasmon generator is configured so that a second surface plasmon is excited on the second plasmon exciting section through coupling with the second evanescent light generated by the second evanescent light generating surface, the second surface plasmon propagates to the second near-field light generating section, and the second near-field light generating section generates second near-field light based on the second surface plasmon.

2. The thermally-assisted magnetic recording head according to claim 1, wherein the first near-field light generating section has a greater width in a track width direction than does the second near-field light generating section.

3. The thermally-assisted magnetic recording head according to claim 1, wherein the first near-field light generating section has a zigzag shape.

4. The thermally-assisted magnetic recording head according to claim 1, wherein at least part of the first evanescent light generating surface and at least part of the first plasmon exciting section are both inclined with respect to an imaginary straight line such that a distance from the imaginary straight line decreases with increasing proximity to the medium facing surface, the imaginary straight line passing internally through the core and being parallel to a direction of travel of the light propagating through the core.

5. The thermally-assisted magnetic recording head according to claim 1, wherein at least part of the second evanescent light generating surface and at least part of the second plasmon exciting section are both inclined with respect to an imaginary straight line such that a distance from the imaginary straight line decreases with increasing proximity to the medium facing surface, the imaginary straight line passing internally through the core and being parallel to a direction of travel of the light propagating through the core.

* * * * *